INVENTOR.
DONALD W. PAYNE

INVENTOR.
DONALD W. PAYNE

BY
ATTORNEY

United States Patent Office 3,540,041
Patented Nov. 10, 1970

3,540,041
FIRE WARNING SYSTEM IMPROVEMENT
Donald W. Payne, Anaheim, Calif., assignor, by mesne assignments, to Whittaker Corporation, Los Angeles, Calif., a corporation of California
Filed July 24, 1967, Ser. No. 655,446
Int. Cl. G08b *17/06, 29/00*
U.S. Cl. 340—409                                7 Claims

ABSTRACT OF THE DISCLOSURE

An electronic system which, when coupled to a eutectic salt heat sensor as used in aircraft, will not only provide an indication of excessive heat but will also distinguish between excessive heat and a malfunction of the heat sensor. A continuous train of electrical pulses is applied through a current sensor to the heat sensor. If a physical fault is developing in the eutectic salt, the pulses will generally cure the fault; however, if the salt sensor is overheating or if an incurable fault exists, thus reducing the impedance of the salt, the current sensor detects the current increase in the pulse train and applies a signal to circuitry which, by determination of the current change rate, distinguishes between a malfunction or a true overheating condition. Further reliability of the system is improved by various test circuits which provide indications of malfunction of the pulse train generator and the various indicator circuits.

BACKGROUND OF THE INVENTION

Large commercial aircraft must carry fire warning systems which will alert the pilot of the impending danger so that appropriate safety measures may be taken to avert disaster. These fire warning systems generally include one or more heat sensors attached directly to the engines and other sensitive components of the aircraft. A heat sensor is generally in the form of a tubular electrically conductive element with a centrally located coaxial conductor separated from the outer tube with a eutectic salt. Under normal conditions, the eutectic salt has a very high resistance and provides effective insulation between the center conductor and the outer tubing; however, when the salt is subjected to a high heat, its internal structure gradually breaks down and its impedance is reduced to a low value. Nearly all present day fire warning systems operate by measuring the impedance between the center conductor and the outside tubing of such a eutectic salt heat sensor.

The eutectic salt heat sensor is extremely reliable in detecting the existence of fire or overheating. It is, however, unreliable in that it often indicates the existence of a fire when none, in fact, exists. It has been discovered that small physical fractures, or faults, will develop in the eutectic salt from shock or vibration and such fractures will cause instantaneous short circuits between the inner conductor and the outer tubing of the heat sensor. When such a false indication of fire is transmitted through a fire warning system to the aircraft crew, it is mandatory that emergency action be taken and, since fire extinguishing action will not turn off the false fire indication, the aircraft may be forced to make an emergency landing. It is apparent that such emergency action results in great loss of time and increased operating expense.

As disclosed in copending application Ser. No. 481,849 filed Aug. 23, 1965, a system has been discovered which cannot only distinguish between a true fire and a fractured heat sensor, but which can also cure or heal many of the fractures which develop in the eutectic salt during flight.

It has been found that the heating of the eutectic salt due to a fire will result in a gradual decrease in resistance between the center conductor and the outside tubing of the sensor. A short circuit through the salt caused by a fault or fracture will result in a nearly instantaneous drop in resistance. The copending application discloses a fire warning system that operates by measuring the time required for the resistance to reach its fullest value. When the resistance drops, either by fire or by fracture, a series of electrical pulses are applied to the center conductor. These pulses will, in many cases, fuse together a fracture in the salt to restore the normal insulation resistance of the salt. If this train of electrical pulses is applied to a sensor which is detecting an actual fire, the resistance of the salt will be unaffected and the fire indicator will continue to operate.

A difficulty encountered with the fire warning system disclosed in the copending application is that not all of the actual faults can be cured by the application of the electrical pulses. It has now been discovered that some faults that occur in the eutectic salt are polarized, so that an electric pulse of one polarity will not cure the fault whereas a pulse of the opposite polarity will cure it. Furthermore, in the prior system, an actual fault had to occur and thus produce a low resistance before the train of healing pulses were applied to the sensor. In the present system, a continuous train of electrical pulses of both polarities are applied to the sensor to cure fractures as they develop.

BRIEF DESCRIPTION OF THE INVENTION

The invention comprises circuitry which is coupled to a eutectic salt type of fire sensor, and includes an electric pulse former and shaper which supplies a continuous train of both positive and negative pulses through a current detector to the sensor; for both curing fractures in the salt which would cause a rapid short circuit between the two coaxial conductors of the sensor; and also for detecting a current flow caused by the reduced resistance in the salt by overheating. The current detector, sensing a current flow into the fire sensor, generates an electrical signal which is rectified and transmitted to a time constant detector. If the rectified signal received by the time constant detector rapidly increases in amplitude, a short circuit indicator is activated; however, if the rectified signal slowly increases in amplitude, the fire warning indicator will be activated. The invention also includes test circuitry which continuously monitors the output of the pulse generator and shaper to provide a malfunction indication, and further includes test circuitry which may be manually activated to test the entire fire warning circuitry and its associated output indicators.

DESCRIPTION OF THE DRAWINGS

In the drawings which illustrate a preferred embodiment of the invention:

In FIG. 1 which shows a general arrangement of the various circuits in block form, pulse generator 10 is connected to an alternating current source, which is preferably 400 cycles, and produces a continuous train of pulses 12 of both positive and negative polarity and having a repetition rate corresponding to the frequency of the alternating current source. Each of the pulses has a sharp rise time and, as will be hereinafter explained, are produced by the discharge of capacitors. The train of pulses 12 is applied through a current detector 14 to a fire sensor 16 which, as previously noted, normally comprises an electrical conductor 18 which is centrally positioned within and insulated from a coaxial tubular conductor 19 by a eutectic salt which lowers in resistance when subjected to such a heat that is produced by a fire in the engine or other component to which a fire sensor 16 is attached. Thus, under normal operating conditions, the train of pulses 12 would be transmitted to the center conductor 18 and, since an extremely high resistance exists between conductor 18 and the ground potential of the outer tubular element 19 of the fire sensor 16, no current flow would be sensed by the current detector 14. If, however, the eutectic salt in the fire sensor 16 lowered in resistance either by sensing a fire or through a fracture in the structure of the salt, current detector 14 would detect this current flow and transmit a signal to rectifier 20 and the resulting direct current signal to time constant detector 22.

Figure 1:
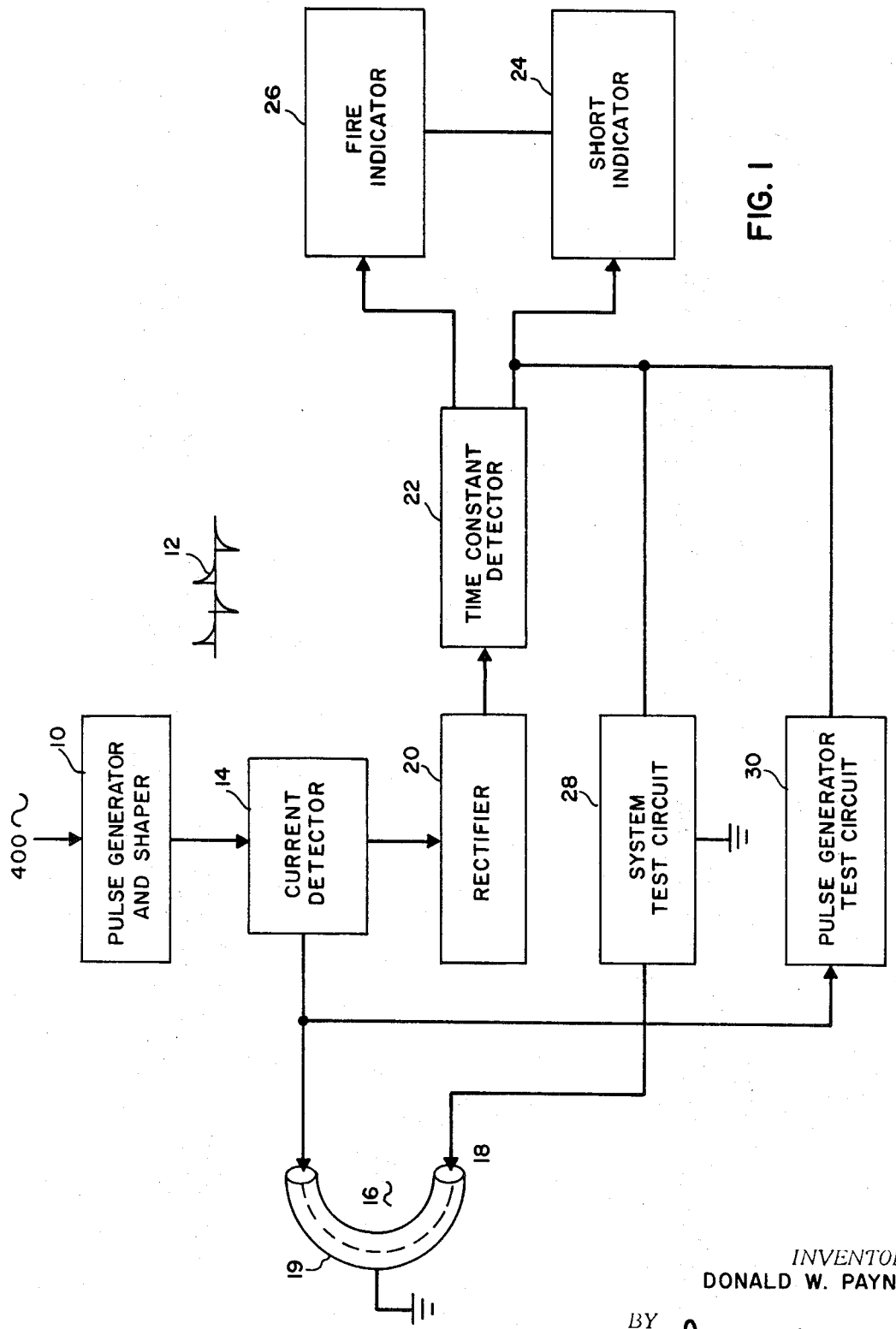
FIG. 1 is a block diagram of the circuitry which incorporates the fire warning circuits and various test circuits of the invention.

It has been found that eutectic salt in a typical fire sensor will display a lower resistance due to a fracture in the lattice structure of the salt itself. Similarly, it has also been discovered that the application of a current pulse having a sharp rise time will, in most cases, fuse a fracture and restore the eutectic salt to its normally high resistance characteristics. It has further been discovered that a low resistance fracture in the eutectic salt may be polarized so that a current pulse of one polarity will not cure the fault whereas a current pulse of the opposite polarity will restore the salt to its normal high resistance. Thus, the train of pulses 12 applied to the center conductor 18 of the fire sensor 16, will not only provide current detector 14 with a signal indicating a fire, but will also provide a continuous source of bipolar fracture healing pulses 12 to the eutectic salt and will thereby prevent the occurrence of any fractures before they actually occur from shock or vibration. In the event that a fracture occurs that cannot be cured by the train of pulses 12, the eutectic salt will display a very rapid decrease in resistance. On the other hand, if a fire is detected by a fire sensor 16, there will be a gradual decrease in resistance. Time constant detector 22 discriminates between the fast current rise produced by a short circuit in the fire sensor 16 and the slow current rise that is typical of a fire sensed by the sensor 16 and applies excitation to either the "short" indicator 24 or the "fire" indicator 26.

In any fire warning system there is a continual danger that the system circuitry itself will fail so that an actual fire will remain undetected until a disaster occurs. System test circuit 28, which may be activated at the convenience of the aircraft crew, tests the operability of the fire warning system by grounding center conductor 18 of the fire sensor 16 so that the circuitry will sense an apparent fire or short circuit in the fire sensor 16. The sudden current sensed by current detector 14 will register as a short circuit on "short" indicator 24 if the circuitry is functioning properly. In order to test the operability of the "fire" indicator 26, the system test circuit 28 may be activated to ground or block the "short" indicator 24 so that fire indicator 26 will become activated. Thus, at the discretion of the aircraft crew, the entire fire warning circuitry, including both "short" indicator 24 and "fire" indicator 26, may be tested by the application of a false short circuit to the fire sensor 16.

An additional safety feature is provided by pulse generator test circuit 30 which samples the pulses 12 as they are applied to the center conductor 18 of the fire sensor 16 and provides an indication on short indicator 24 in the event of an AC power failure or circuit failure in the pulse generator and shaper 10.

Figure 2:
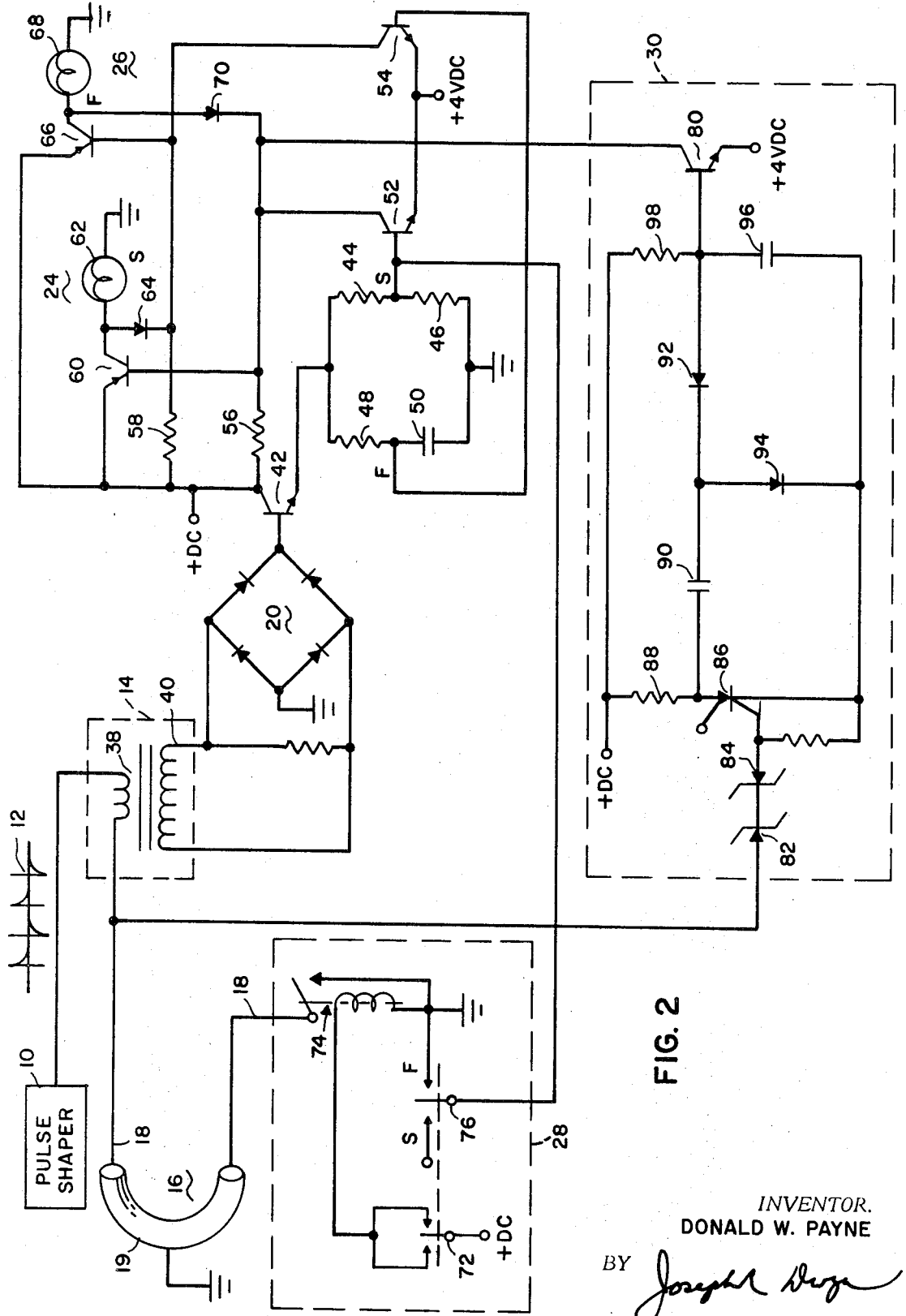
FIG. 2 is a schematic diagram of the circuitry displayed in block form in FIG. 1.

FIG. 2 schematically illustrates circuitry for implementing the block diagram of FIG. 1. Pulse shaper 10 which will hereinafter be explained in detail supplies a steep wavefront pulse of both polarities through current detector 14 to the center conductor 18 of fire sensor 16. Current detector 14 is comprised of a current transformer which may have a pimary to secondary turns ratio of 2:36. Seconday terminals 40 of the current transformer are connected to the input terminals of rectifier 20 which may consist of four diodes connected in a standard bridge rectifier configuration. The negative output terminal of rectifier 20 is connected to ground and the positive output terminal is coupled to the base of an NPN transistor 42 which functions as a power amplifier. The collector of transistor 42 is connected to a source of positive direct current which may be at a potential of 28 volts and the emitter of transistor 42 is connected to time constant detector 22.

Time constant detector 22 which discriminates between an input signal having a fast rise time, indicating a short circuit in fire sensor 16, and an input signal having a relatively slow rise time, indicating overheating of fire sensor 16, is comprised of two parallel circuits connected between the emitter of transistor 42 and ground. The "short" branch of time constant detector 22 consists of a first resistance 44, which may have a value of 10K ohms, in series with a second resistance 46, which may have a value of 20K ohms. The "fire" branch of detector 22 consists of a resistance 48, which may have a value of 10K ohms, in series with a capacitor 50, which may have a value of 1 microfarad. The operation of this circuit will be explained in detail under the section entitled "Operation." The output of the "short" branch of time constant detector 22 is taken from the junction of resistors 44 and 46 and is applied to the base of NPN transistor 52. Similarly the output of the "fire" branch of detector 22 is taken from the the junction of resistor 48 and capacitor 50 and is applied to the base of NPN transistor 54 which should preferably be the same type as transistor 52. The emitters of transistors 52 and 54 are coupled to small positive bias potential and the collectors are coupled to the positive terminal of a direct current source through resistors 56 and 58 respectively, which may each have resistance values of 10K ohms. The collector of transistor 52 is coupled to the base of PNP transistor 60 which comprises a portion of "short" indicator 24. The emitter of transistor 60 is connected to the positive terminal of a direct current source and the collector of transistor 60 is coupled to ground through an indicating device 62 which may be an indicating lamp having a 28 volt filament. The collector of transistor 60 is also connected to the anode of diode 64, the cathode of which is coupled to the collector of transistor 54.

The collector of transistor 54 is connected to the base of a PNP transistor 66, the emitter of which is connected directly to the positive terminal of the direct current source and the collector of which is connected to ground through an indicating device 68 which may be an indicating lamp with a 28 volt filament. The collector of transistor 66 is also connected to the anode of diode 70, the cathode of which is coupled to the collector of transistor 52.

System test circuit 28 is comprised of a positive action double-pole double-throw switch with an "off" center position and a single-pole double-throw relay. As shown in FIG. 2, toggle 72 of the double-pole double-throw switch is connected to a positive terminal of a direct current source. The contacts associated with toggle 72 are connected together and to one terminal of the excitation coil of single-pole double-throw relay 74, the other terminal of which is connected to ground. The moving contact of relay 74 is connected to center conductor 18 of the fire sensor 16 and the stationary contact of relay 74 is connected to ground so that upon excitation of relay 74 the center conductor 18 becomes grounded. Toggle 76 of the double-pole double-throw switch is connected to the base of transistor 52 and the particular contact associated with toggle 76 and which represents the "short" test position remains disconnected while the other contact representing the "fire" position is connected to ground. Toggles 72 and 76 of the double-pole double-throw switch are mechanically connected together within the switch and may be activated manually whenever it is desired to test the circuitry of the fire warning system.

The pulse generator test circuit 30, shown schematically in FIG. 2, is provided to sample the string of pulses 12 produced by pulse shaper 10 and to provide a "short" indication at indicator lamp 62 in the event that there is a malfunction of the pulse shaper 10 by either the failure to produce pulses of either positive or negative polarity, or the failure to produce pulses of sufficient amplitude. For this purpose, the pulse generator test circuit 30 samples the input from the center conductor 18 of the fire sensor 16 and, if pulse shaper 10 is properly operating, produces an output signal to the base of an NPN transistor 80, the collector of which is coupled to the collector of transistor 52 in the "short" indicator circuit and the emitter of which is connected to a small positive bias source. As long as the base of transistor 80 is maintained as a negative potential with respect to its emitter, transistor 80 will be disabled and will produce no "short" output indication. However, should the base of transistor 80 become positive with respect to its emitter, a "short" indication will be produced.

In the embodiment illustrated, pulse generator test circuit 30 is connected to the center conductor 18 of fire sensor 16 through two back-to-back Zener diodes 82 and 84, each of which may have a Zener voltage of 8.2 volts. An input signal, which must exceed this Zener voltage, is then applied to the cathode gate of a silicon controlled switch 86, the cathode of which is connected to ground, and the anode of which is connected to the positive terminal of a 28 volt source through a resistance 88 which may have a value of 15K ohms. The anode of silicon control switch 86 is coupled through a capacitor 90, which may have a value of .015 microfarads, to the cathode of a diode 92 and the anode of diode 94. The cathode of diode 94 is connected to ground and the anode of diode 92 is connected to the base of transistor 80 and to a storage capacitor 96, the other terminal of which is connected to ground. The base of transistor 80 is also connected to the positive 28 volt source through a resistance 98 which may have a value of 270K ohms.

Zener diodes 82 and 84 assure that only those pulses which exceed the Zener voltage will enter the pulse generator test circuit 30 so that if pulse shaper 10 is producing pulses of insufficient amplitude, there will be an indication on "short" indicator 62. When pulses of sufficient amplitude are present, silicon controlled switch 86 will become conductive upon the occurrence of a pulse of a first polarity and will become nonconductive upon the occurrence of pulses of opposite polarity. Thus, silicon controlled switch 86 produces at its anode a square wave output having a frequency and pulse length determined by the string of pulses 12 produced by pulse shaper 10. The alternating switching of the silicon controlled switch 86 produces a corresponding switching or charge on storage capacitor 96 and the repetition rate of this switching will maintain the base of transistor 80 slightly negative with respect to its positive emitter potential. However, should pulse shaper 10 fail to produce a pulse of sufficient amplitude or fail to produce a pulse of one polarity, the storage capacitor 96 would fail to charge or discharge and a positive DC potential would be applied through resistor 98 to the base of transistor 80 which would in turn activate the "short" indication circuit.

Figure 3:
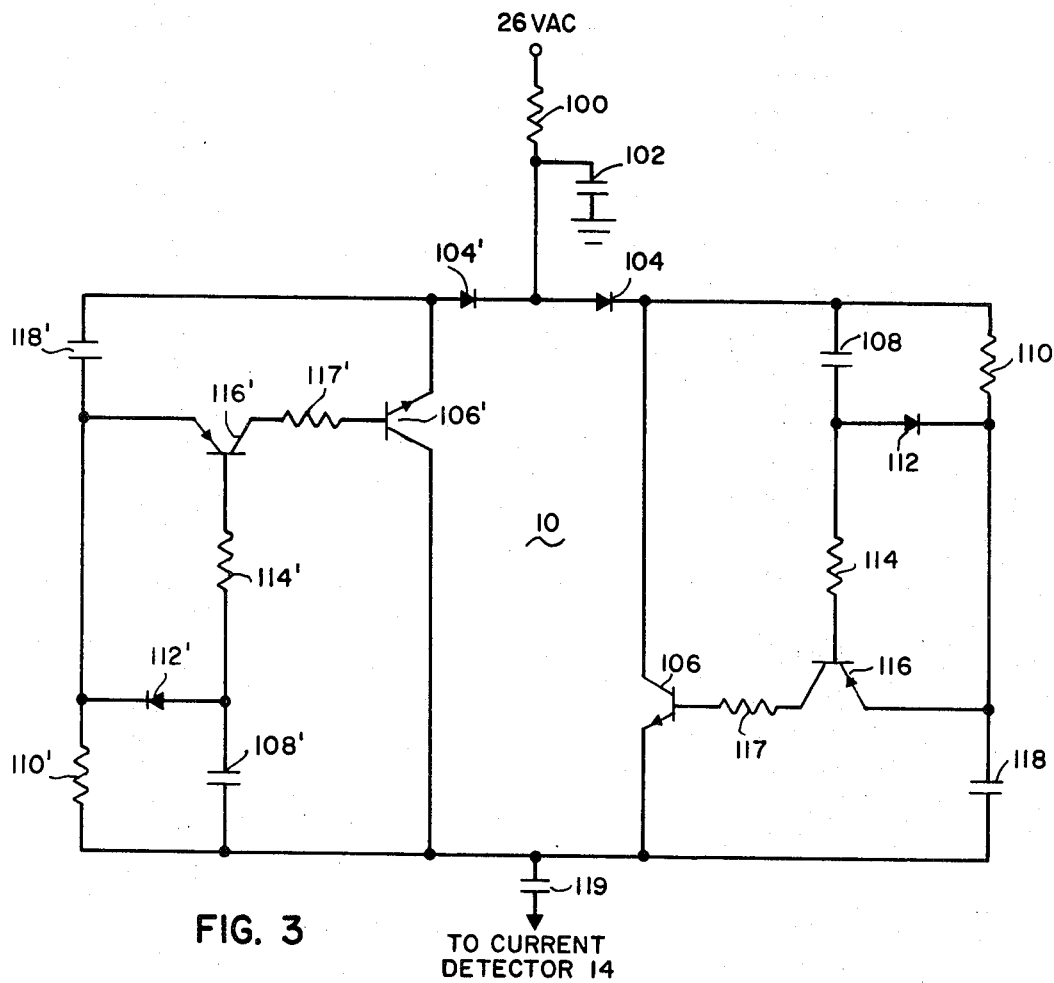
FIG. 3 is a schematic diagram of the pulse generator and shaper circuitry.

Pulse shaper 10 is schematically illustrated in detail in FIG. 3. It will be noted that the circuit is symmetrical; the circuit to the right produces positive pulses and the circuit to the left is identical but inverted and produces negative pulses. Since the two symmetrical circuits are identical and operate in the same manner, only the right circuit will be explained in detail. A resistance 100, which serves as an isolation resistance and may have a value of 200 ohms, is coupled between a 400 cycle 26 volt power source and a storage capacitor 102 the other terminal of which is grounded. Storage capacitor 102 may have a value of 1.0 microfarad. The junction of resistance 100 and capacitor 102 is connected to the anode of a diode 104, the cathode of which is connected to the collector of an NPN transistor 106, a capacitor 108, which may have a value of 0.1 microfarad, and a resistance 110 The second terminal of capacitor 108 is coupled to the anode of a diode 112, the cathode of which is connected to the second end of resistance 110. The junction of capacitor 108 and diode 112 is coupled through a resistance 114 to the base of a PNP transistor 116, the emitter of which is connected to the junction of diode 112 and resistance 110, and the collector of which is coupled through a resistance 117 to the base of transistor 106. The emitter of transistor 116 is also connected to a capacitor 118, which may have a value of 1.0 microfarad, the second terminal of which is coupled to the emitter of transistor 106. The output of the circuit is taken from the emitter of transistor 106, through an AC coupling capacitor 119.

On the positive half cycle from the AC source, current flows through resistance 100 and begins to charge storage capacitor 102. The current also passes through diode 104 to charge capacitor 108 and capacitor 118. During this charging period the small voltage across the diode 112 maintains the base positive with respect to the emitter so that transistor 116 is nonconductive. When the AC voltage peak is reached and starts down, the diodes 104 and 112 are cutoff so that the charge on the capacitor 108 is applied as a negative potential to the base of transistor 116 becomes reduced with respect to the emitter thus rendering transistor 116 conductive. At this point the positive potential on the partially charged capacitor 118 is applied through transistor 116 and resistance 117 to the base of transistor 106, suddenly rendering that transistor conductive. The fully charged storage capacitor 102 is then permitted to discharge through transistor 106 to the output terminals of the circuit.

During the negative half cycle of the AC source, the left portion of the pulse generator operates in the identical manner to produce a negative pulse having a very sharp rise time.

OPERATION

As previously noted, the pulse generator and shaper 10 produces sharp rise time pulses of both positive and negative polarity through the current detector 14 to the fire sensor 16. If the fire sensor senses an actual fire, there will be a relatively slow increase in current sensed by the current detector 14, and if there is a short circuit in the fire sensor system, there will be a relatively fast rise in current sensed by current detector 14. These currents are rectified by bridge rectifier 20, are amplified by the power amplifier 42 and applied to time constant detector 22 which has two output terminals respectively connected to the "short" indicator 24 and the "fire" indicator 26. The "short circuit" branch of time constant detector 22 comprises two series resistances and the output therefrom is taken from the junction of these resistances which acts as a voltage divider circuit between the emitter of transistor 42 and ground. The "fire" branch of time constant detector 22 comprises a resistance and capacitor in series between the emitter of transistor 42 and ground and the output is taken at the junction of resistance 48 and capacitance 50.

Figures 4, 5:
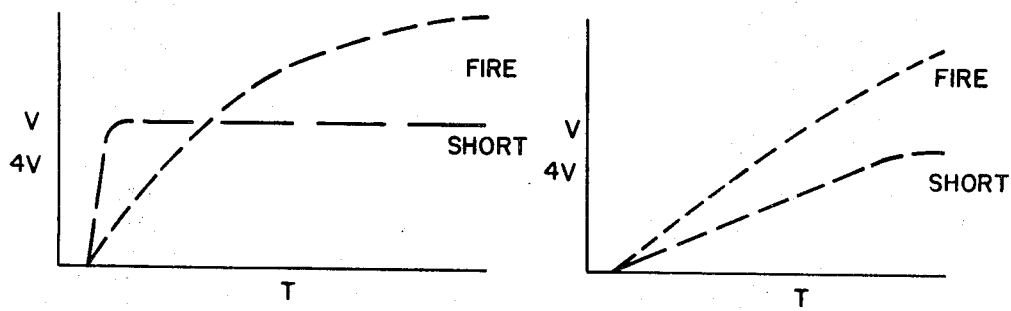
FIG. 4 is a graph illustrating response characteristics when the time constant detector senses a short circuit signal from the current detector.
FIG. 5 is a graph of the response characteristic of the time constant detector when the current detector senses an indication of "fire."

FIGS. 4 and 5 illustrate typical output curves of the time constant generator 22. If a short circuit occurs in fire sensor 16, there is a rapid increase in current and a consequent rapid conduction of transistor 42 and the output of the short circuit branch of time constant detector 22, as illustrated in FIG. 4. Because of the time constant of resistance 48 and capacitor 50 in the "fire" branch of the time constant detector, the "fire" output voltage will rise much slower, as illustrated in FIG. 4. In the event of an actual fire, current detector 14 will sense a relatively slow increase in current and the voltages appearing at the respective output terminals of the time constant detector 22 will appear as shown in FIG. 5. The two output voltages from time constant detector 22 are applied to their respective indicators which comprise transistors 52 and 54 and the circuitry associated therewith.

If a short circuit occurs in fire sensor 16, the quicker rising "short" voltage appearing in FIG. 4 will be applied to the base of transistor 52 to render that transistor conductive. As transistor 52 draws current from the DC source through resistance 56, the voltage appearing on the collector of transistor 52 is lowered and there is a corresponding lowering of voltage on the base of transistor 60. This PNP transistor 60 is now rendered conductive and substantially the full DC power source voltage is applied across indicator lamp 62 to indicate that a "short" exists in the fire warning system.

When transistor 60 becomes conductive to apply the full source voltage across indicator lamp 62, this same voltage is applied through diode 64 to the base of transistor 66. This provides a lock-out feature so that any subsequent conduction of transistor 54 in the "fire" indicator system will draw collector current through diode 64 rather than resistance 58. The result is that there will be no potential drop at the collector of transistor 54 or the base of transistor 66, and transistor 66 will remain nonconductive.

In the event of an actual fire sensed by sensor 16, the output voltages occurring at the terminals of time constant detector 22 will appear as shown in FIG. 5. During the slower rise of these voltages, the output from the "short" terminal of time constant detector 22 will be reduced because of the voltage divider action of resistors 44 and 46. The "fire" branch will produce a voltage sufficient to render transistor 54 conductive and thus decrease the potential appearing on the base of transistor 66. When transistor 54 becomes conductive, transistor 66 will conduct to apply the full source potential across indicator lamp 68. This potential is also applied through diode 70 to the base of transistor 60 to render transistor 60 nonconductive.

As pulse shaper 10 produces its train of positive and negative pulses, these pulses are sampled by the pulse generator test circuit 30 through Zener diodes 82 and 84. In the event that pulse shaper 10 fails to produce pulses of adequate amplitude or otherwise fails, pulse generator test circuit 30, which has been explained in detail, will apply a positive voltage to the base of transistor 80 thereby rendering that transistor conductive so that it will draw current through resistor 56 to lower the potential on the base of transistor 60, thereby rendering transistor 60 conductive to apply the full source voltage across indicator lamp 62. If the pulse shaper produces low amplitude pulses due to low heat sensor resistance resulting from an actual fire, transistor 66 will be conductive and will supply the current to the collector of transistor 80 through diode 70. Thus, an indication from lamp 62 may indicate not only a short circuit in the fire sensor 16, but also a malfunction of pulse shaper 10.

System test circuit 28 comprises a double-pole double-throw manually operated switch and a single pole single throw relay. If it is desired to test the operability of the fire warning system, a crew member may activate the manually operated switch to its left, or "short" position. This forces relay 74 to close and to ground the center conductor 18 of the fire sensor 16. This grounding causes a rapid increase in current through the current detector and the time constant detector 22 will produce an output which activates the short indicator 24.

If the manually operated switch is placed in the right or "fire" position, the base of transistor 52 in the short indicator circuit 24 becomes grounded so that transistor 52 will remain nonconductive. With transistor 52 nonconductive, transistor 54 will become activated to produce a "fire" indication in indicator lamp 68. The operability of the entire fire warning system may thus be accurately and rapidly tested at any desired time.

Having thus described the preferred embodiment of my invention, what is claimed is:

1. A fire warning system for use with a fire sensor for indicating both the presence of fire and a malfunction of the sensor and the fire warning system circuitry, and for curing fractures in an eutectic salt type of fire sensor, said fire warning system comprising:

pulse generating means coupled to the fire sensor for applying bipolar voltage pulses having steep wave fronts across the eutectic salt;

current detection means coupled for sensing the current flow produced by said bipolar pulses through the fire sensor;

time detection means coupled to said current detection means for producing first and second output signals, the first having an amplitude directly proportional to the amplitude of the current change and the second an amplitude gradually increasing at a rate proportional to the amplitude of the current change sensed by said current detection means; and circuit means coupled to said time detection means and responsive to the output signals therefrom for activating a first indicator when the amplitude of the first output signal from said time detection means exceeds the second output signal and for activating a second indicator when the amplitude of the second output signal exceeds the first output signal.

2. A fire warning system as claimed in claim 1 wherein said time detection means includes a voltage divider circuit for producing an instantaneous output signal with limited amplitude and a time constant circuit for producing an output signal having a slower rise time and ultimately higher steady state amplitude than the instantaneous output signal.

3. The fire warning system, as claimed in claim 1, wherein said circuit means includes lock-out means for disabling the first indicator upon activation of the second indicator and for disabling the second indicator upon activation of the first indicator.

4. A fire warning system, as claimed in claim 1, wherein said current detection means comprises a current transformer, the primary windings of which are coupled in series between said pulse generating means and the fire sensor.

5. A fire warning system, as claimed in claim 1, further including a rectifier and amplifier coupled between said current detection means and said time detection means.

6. A fire warning system, as claimed in claim 1, further including pulse testing means coupled to sense the repetition and the amplitude of the bipolar pulses produced by said pulse generating means said testing means producing a signal for activating an indicator upon malfunction of said pulse generating means.

7. A fire warning system, as claimed in claim 1, further including system testing means coupled to the fire sensor and to said circuit means for causing an increased current to be sensed by said current detection means and the consequent activation of an indicator.

References Cited

UNITED STATES PATENTS 2,901,740 8/1959 Cutsogeorge _____ 340—228
3,406,389 10/1968 Nailen _____ 340—411

ALVIN H. WARING, Primary Examiner

C. MARMELSTEIN, Assistant Examiner

U.S. Cl. X.R.

340—228, 411